US009639080B2

(12) United States Patent
Hosaka (10) Patent No.: US 9,639,080 B2
(45) Date of Patent: May 2, 2017

(54) CONTROLLER FOR CONTROLLING MACHINE TOOL AND ROBOT

(71) Applicant: FANUC Corporation, Yamanashi (JP)

(72) Inventor: Takashi Hosaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 308 days.

(21) Appl. No.: 14/299,954

(22) Filed: Jun. 9, 2014

(65) Prior Publication Data

US 2014/0364989 A1 Dec. 11, 2014

(30) Foreign Application Priority Data

Jun. 11, 2013 (JP) ................................. 2013-122637

(51) Int. Cl.
*G06F 19/00* (2011.01)
*G05B 19/418* (2006.01)

(52) U.S. Cl.
CPC ............... *G05B 19/41825* (2013.01); *G05B 2219/45213* (2013.01); *Y02P 90/087* (2015.11); *Y10S 901/50* (2013.01)

(58) Field of Classification Search
CPC . B25J 9/1679; B25J 9/16; G05B 2219/36159; G05B 19/00
See application file for complete search history.

(56) References Cited

U.S. PATENT DOCUMENTS

| 4,348,623 | A |   | 9/1982  | Kobayashi et al. |                        |
|-----------|---|---|---------|------------------|------------------------|
| 4,590,572 | A | * | 5/1986  | Imanishi         | G05B 19/408<br>700/169 |
| 4,887,014 | A | * | 12/1989 | Kato             | B23K 11/252<br>318/49  |
| 5,198,737 | A | * | 3/1993  | Harima           | G05B 19/4147<br>318/568.11 |
| 5,444,343 | A | * | 8/1995  | Enomoto          | G05B 19/4141<br>318/567 |
| 5,798,627 | A | * | 8/1998  | Gilliland        | B25J 9/1671<br>318/568.13 |
| 6,442,436 | B1 | * | 8/2002 | Nogami           | G06F 11/3404<br>318/565 |

(Continued)

FOREIGN PATENT DOCUMENTS

JP 56-11510 A 2/1981
JP H06134652 A 5/1994

(Continued)

OTHER PUBLICATIONS

Decision to Grant a Patent mailed Apr. 28, 2015, corresponding to Japanese patent application No. 2013-122637.

(Continued)

*Primary Examiner* — Darrin Dunn (74) *Attorney, Agent, or Firm* — Hauptman Ham, LLP (57) ABSTRACT

A controller for controlling a machine tool and a robot includes a storage unit, configured to store an input machining program including a statement for machine tool and a statement for robot, and a machining program distribution unit configured to transfer the statement for machine tool, out of the statements for machine tool and statements for robot that are included in the stored machining program, to the machine tool control unit and to transfer the statement for robot to the robot control unit.

2 Claims, 11 Drawing Sheets

(56) References Cited

U.S. PATENT DOCUMENTS

| | | | | |
|---|---|---|---|---|
| 6,807,461 | B2* | 10/2004 | Kneifel, II | B25J 9/1682 |
| | | | | 118/500 |
| 7,729,804 | B2* | 6/2010 | Matsumoto | B25J 9/1669 |
| | | | | 700/19 |
| 2006/0217841 | A1* | 9/2006 | Matsumoto | B25J 9/1669 |
| | | | | 700/248 |
| 2011/0118874 | A1* | 5/2011 | Tanabe | B25J 9/1682 |
| | | | | 700/248 |
| 2014/0316565 | A1* | 10/2014 | Aoyama | B25J 9/16 |
| | | | | 700/249 |

FOREIGN PATENT DOCUMENTS

| | | |
|---|---|---|
| JP | H06149329 A | 5/1994 |
| JP | 10-83211 A | 3/1998 |
| JP | 2008-23587 A | 2/2008 |

OTHER PUBLICATIONS

Office Action mailed Nov. 18, 2014, corresponding to Japanese patent application No. 2013-122637.

\* cited by examiner

MACHINING PROGRAM

STATEMENT 1 FOR MACHINE TOOL

STATEMENT 2 FOR MACHINE TOOL

STATEMENT 1 FOR ROBOT

STATEMENT 2 FOR ROBOT

STATEMENT 3 FOR ROBOT

STATEMENT 3 FOR MACHINE TOOL

STATEMENT 4 FOR MACHINE TOOL

CONTROLLER FOR CONTROLLING MACHINE TOOL AND ROBOT

RELATED APPLICATIONS

The present application claims priority to Japanese Application Number 2013-122637, filed Jun. 11, 2013, the disclosure of which is hereby incorporated by reference herein in its entirety.

BACKGROUND OF THE INVENTION

Field of the Invention

The present invention relates to a controller for controlling a machine tool and a robot, and more particularly, to a controller for controlling both a machine tool and a robot based on a single machining program.

Description of the Related Art

Conventionally, an operator of a machine tool generally performs so-called loading and unloading operations, such as workpiece mounting and removing operations. Recently, however, robots have come to be frequently used in these operations to continuously run the machine tool for a long time. In the case where a robot 200 for these operations is attached to a machine tool 100, as shown in FIG. 12, the machine tool 100 and the robot 200 are provided with a machine tool control unit 40 and a robot control unit 50, respectively, and a machining program 22 and a robot program 52 are delivered to these control units, individually.

Figure 12:
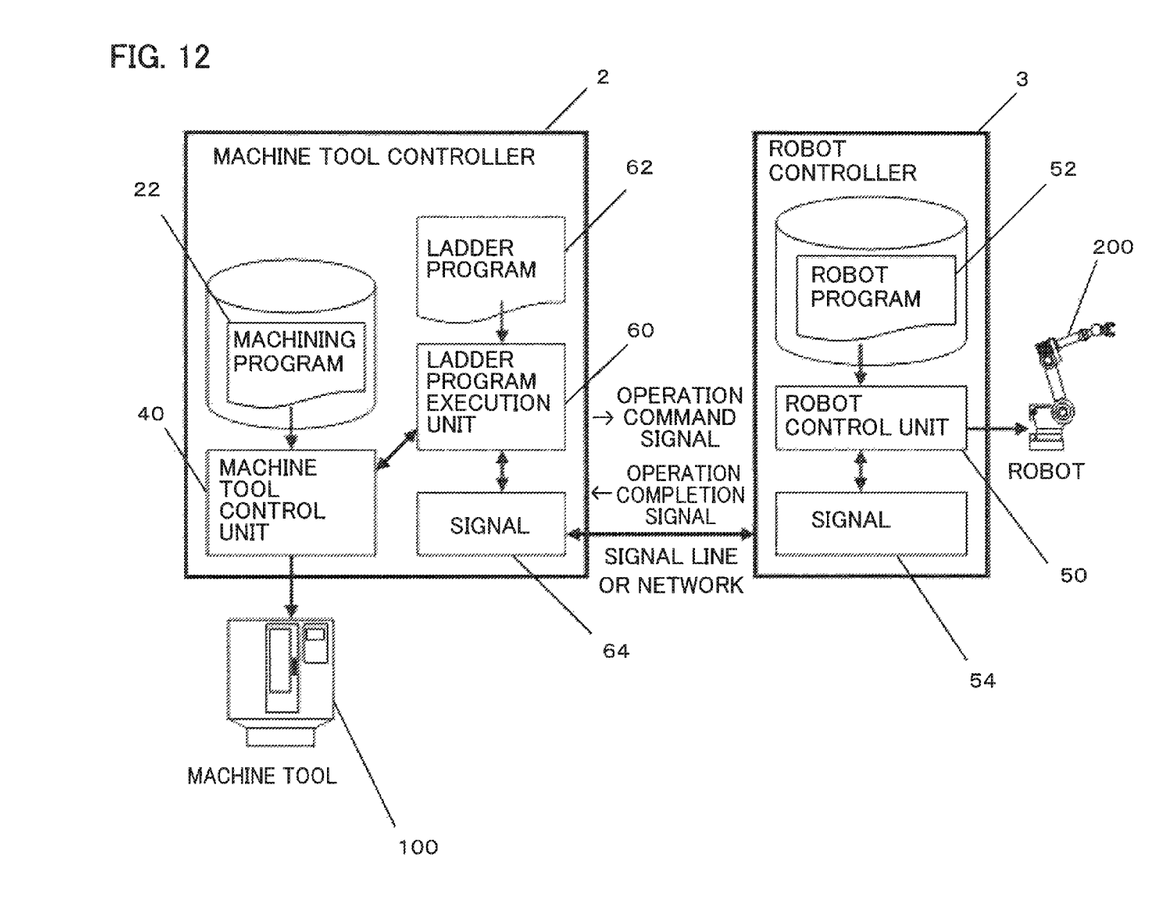
FIG. 12 is a diagram showing a first prior art example of a control system for machine tool and robot.

In cooperatively operating the machine tool 100 and the robot 200 according to a first example of a control system for them shown in FIG. 12, a machine tool controller 2 and a robot controller 3 independent of each other are connected by a signal line or network, and an operation command signal and an operation completion signal are transferred between them. In the machine tool controller, a ladder program is used to coordinate the machining program 22 with these signals. The following is a description of a specific control method.

(1) The machine tool controller 2 controls the machine tool 100 based on the machining program 22. Further, the robot controller 3 controls the robot 200 based on the robot program 52.

(2) If the machine tool 100 requires operation of the robot 200, a robot work code, such as an M-code, in the machining program 22 is executed.

(3) When a robot work designation code in the machining program 22 is executed, the machine tool control unit 40 notifies a ladder program execution unit 60 of the execution of the robot work designation code.

(4) When notified of the execution of the robot work designation code, the ladder program execution unit 60 turns on the operation command signal for the robot according to the instruction of a ladder program 62. The operation command signal includes the type of the robot operation.

(5) When the robot control unit 50 detects the activation of the operation command signal, the robot controller 3 controls the robot 200 based on a relevant instruction in the robot program 52. When the movement of the robot 200 is completed, the robot control unit 50 turns on the operation completion signal.

(6) The ladder program execution unit 60 of the machine tool controller 2 notifies the machine tool control unit 40 of detected activation of the operation completion signal according to the instruction of the ladder program 62.

Thereupon, the machine tool control unit 40 continues to control the machine tool 100 based on the machining program 22.

Figure 13:
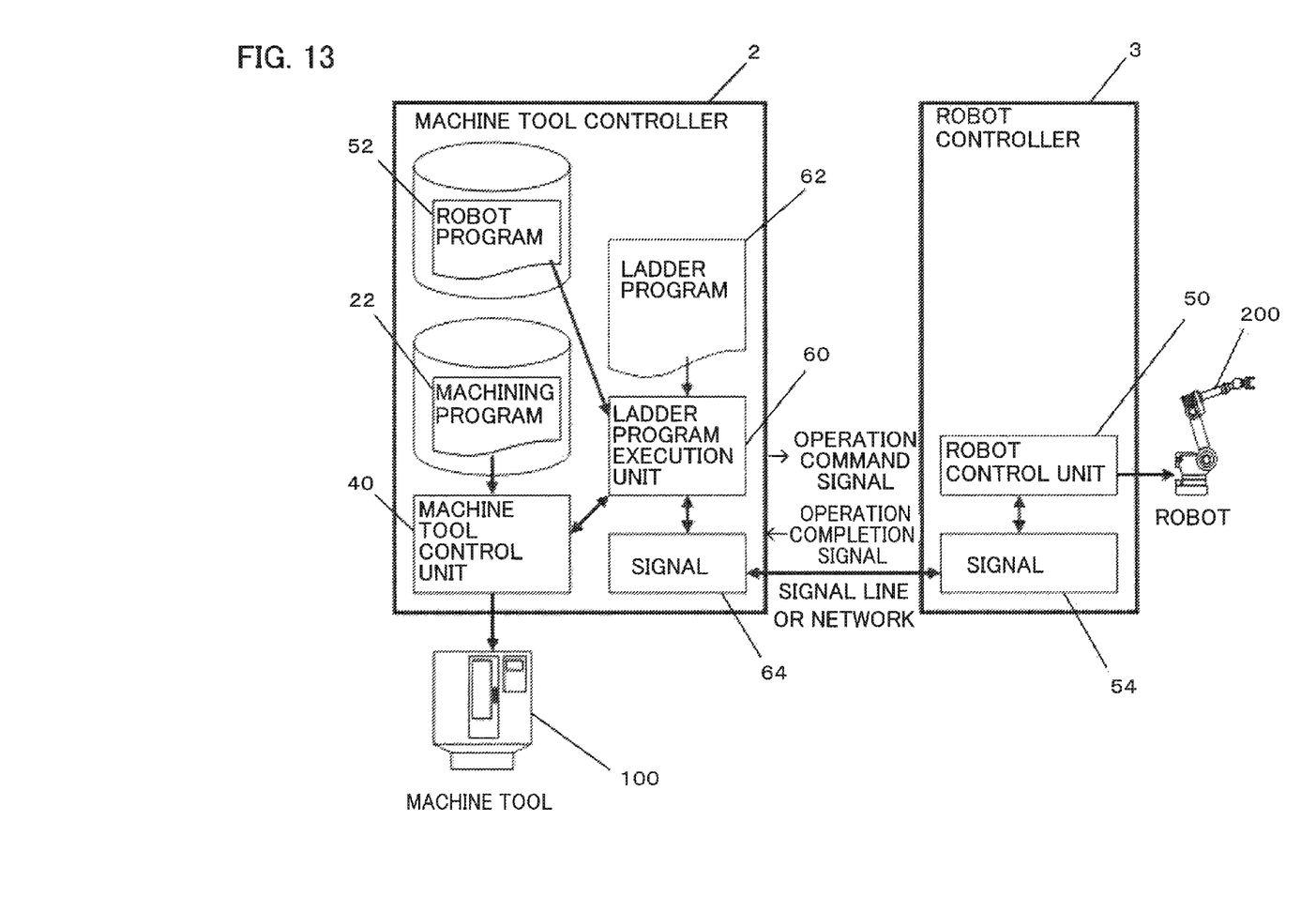
FIG. 13 is a diagram showing a second prior art example of the control system for machine tool and robot.

FIG. 13 is a diagram showing a second example of the control system for the machine tool 100 and the robot 200. In this example, both the machine tool 100 and the robot 200 are controlled by means of a single controller, in order to reduce an operator's labor for learning the operation of two types of controllers for the machine tool 100 and the robot 200.

The machine tool controller 2 manages both the machining program 22 for the machine tool 100 and the robot program 52 for the robot 200. In controlling the robot 200, the ladder program execution unit 60 of the machine tool controller 2 converts the robot program 52 to a corresponding operation command signal based on the instruction of the ladder program 62. This operation command signal includes the content of the operation of the robot 200, that is, the behavior of the robot 200. The ladder program 62 is used to coordinate the machining program 22 for the machine tool 100 with the robot program 52 for the robot 200.

Japanese Patent Application Laid-Open No. 6-149329 discloses a robot controller comprising a CPU for controlling a machine tool, a CPU for controlling a robot, and a shared RAM interposed between these CPUs. This controller is configured so that the CPU for controlling the robot receives a robot program from both commands from an external device and a control panel.

Japanese Patent Application Laid-Open No. 6-134652 discloses a control method for a robot hand of a numerical control machine tool, in which the robot hand is attached to a tool mounting portion of the machine tool so that it can be position-controlled and opened or closed by NC language.

According to the technique shown in FIG. 12, the machining program and the robot program are activated independently of each other. To achieve cooperative operations of the machine tool and the robot, data including the type of operation, timing for the start of operation, etc., are transferred between the machining program and the robot program.

The ladder program is used for the transfer of these data. Since the ladder program includes processing for the basic control of the machine tool, only the manufacturer of the machine tool is allowed to edit it, and users are not. Therefore, the machine tool manufacturer determines specifications for the way the machine tool and the robot cooperate with each other and provides a ladder program to achieve the specifications.

Consequently, the machine tool manufacturer is expected to create the ladder program for the cooperative operations of the machine tool and the robot, thus suffering increased burden in program creation.

Since the mechanism of the coordination is achieved by the ladder program, on the other hand, a user cannot add any new functions, thus proving poor extensibility. While work instructions from the user are given in the form of digital codes, such as M-codes, the number of types of work instructions that can be given from the machining program to the robot program depends on the specifications determined by the machine tool manufacturer. Thus, any of the available work instructions is expected to be based on the specifications, so that the user is not allowed to add new types of work instructions afterward.

Normally, the workpiece loading and unloading operations and the like are previously assumed and incorporated in the ladder program by the machine tool manufacturer. If the user intends to additionally cause the machine tool and the robot to cooperatively carry out various operations related to machining, however, he/she cannot add any new functions to the ladder program. If the user dare add a new function, he/she must ask the machine tool manufacturer to modify the ladder program, thus suffering increased burden.

Since the machining program and the robot program are independent of each other, moreover, it is sometimes difficult to understand from the programs how the machine tool and the robot behave if they are simultaneously operated, for example, in particular. If the behaviors of the machine tool and the robot cannot be easily understood from the programs, identification of the operation is so time-consuming that the user suffers increased burden in start-up operation.

Also in the technique shown in FIG. 13, the machine tool controller 2 manages both the machining program 22 and the robot program 52. Since the ladder program is still used to coordinate the machining program with the robot program, however, this technique has the same problem with the technique shown in FIG. 12.

According to the technique disclosed in Japanese Patent Application Laid-Open No. 6-149329, the robot program for controlling the robot is configured to be received from the command from the external device or the command from the control panel, so that it is independent of the machining program for controlling the machine tool. In some cases, therefore, it is difficult to understand how the machine tool and the robot behave.

According to the technique disclosed in Japanese Patent Application Laid-Open No. 6-134652, in contrast, the robot hand is mounted in a tool mounting position on the machine tool so that it can be position-controlled and opened or closed by NC language. This "robot hand" is attached to the tool mounting portion of the machine tool, not of the robot, and is controlled and driven by the control axis of the numerical control machine tool, so that it should naturally be regarded as a part of the machine tool. Since the operating range of the robot hand is limited to that of the control axis of the machine tool, moreover, it is difficult for the user to perform various operations related to machining along with the loading and unloading operations by means of the robot hand.

SUMMARY OF THE INVENTION

Accordingly, the object of the present invention is to provide a controller for controlling a machine tool and a robot, capable of determining cooperative operations of the machine tool and the robot based on a machining program only.

A controller according to the present invention is configured to control at least one machine tool and at least one robot, and comprises a machining program input unit configured to input a machining program, which includes at least one statement for machine tool and at least one statement for robot, to the controller, a machining program storage unit configured to store in the controller the machining program input by the machining program input unit, a machine tool control unit configured to control the machine tool based on the statement for machine tool, a robot control unit configured to control the robot based on a statement for robot, and a machining program distribution unit configured to transfer the statement for machine tool, out of statements for machine tool and statements for robot that are included in the machining program stored in the machining program storage unit, to the machine tool control unit and to transfer the statement for robot to the robot control unit.

The machining program distribution unit may comprise a sequential execution unit configured, if the target of the statement read from the machining program is changed from the machine tool to the robot or from the robot to the machine tool, to transfer the statement to the machine tool control unit or the robot control unit as the target of the post-change statement after the control based on the statement transferred to the machine tool control unit or the robot control unit as the target of the pre-change statement is completed.

The machining program distribution unit may comprise a simultaneous start unit configured to transfer the statements for machine tool and statements for robot, included within a range previously specified by the machining program, to the machine tool control unit and the robot control unit, respectively, and then simultaneously perform instructions of start of control based on the transferred statements to the machine tool control unit and the robot control unit, whereby the machine tool and the robot are simultaneously caused to start to be controlled.

The machining program distribution unit may comprise a waiting unit configured to wait until the completion of both the control by the machine tool control unit based on the statement transferred thereto and the control by the robot control unit based on the statement transferred thereto, whereby, after the end of the control of both the machine tool and the robot is awaited by the waiting unit, the next control is allowed to be performed.

According to the present invention, there can be provided a controller for controlling a machine tool and a robot, capable of determining cooperative operations of the machine tool and the robot based on a machining program only.

BRIEF DESCRIPTION OF THE DRAWINGS

The above and other objects and features of the present invention will be apparent from the ensuing description of embodiments with reference to the accompanying drawings, in which.

DETAILED DESCRIPTION OF THE PREFERRED EMBODIMENTS

Figure 1:
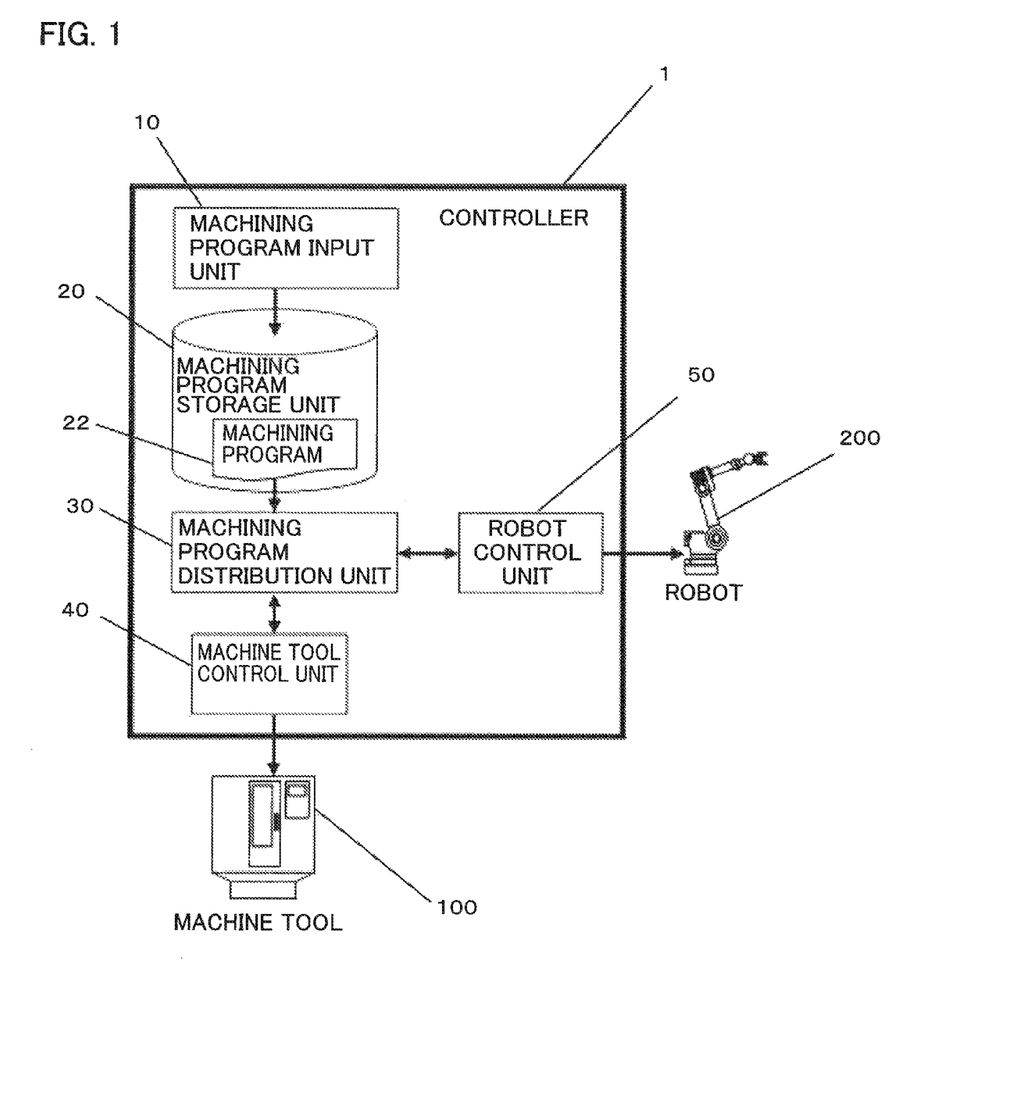
FIG. 1 is a diagram illustrating a configuration of a first embodiment of a controller according to the present invention.

A first embodiment of a controller according to the present invention will first be described with reference to FIG. 1.

A controller 1 comprises a machining program input unit 10, machining program storage unit 20, machining program distribution unit 30, machine tool control unit 40, and robot control unit 50.

The machining program input unit 10 inputs machining programs 22, which include both statements for machine tool and statements for robot. The machining program storage unit 20 stores the machining programs 22 input from the machining program input unit 10. An operator selects an active machining program from the machining programs 22 stored in the machining program storage unit 20 and designates actual machining.

When the machining is designated by the operator, the machining program distribution unit 30 sequentially reads the content of the machining program assigned from the machining programs 22 stored in the machining program storage unit 20. If the read content is the statement for machine tool, it is transferred to the machine tool control unit 40. If the read content is the statement for robot, on the other hand, it is transferred to the robot control unit 50.

The machine tool control unit 40 to which the statement for machine tool is transferred controls a machine tool 100 according to the statement, while the robot control unit 50 to which the statement for robot is transferred controls a robot 200 according to the statement. Thus, both the machine tool 100 and the robot 200 can be controlled based on the machining programs 22 including both the statements for machine tool and statements for robot.

A modification of the first embodiment (FIG. 1) will be described with reference to FIG. 2.

Figure 2:
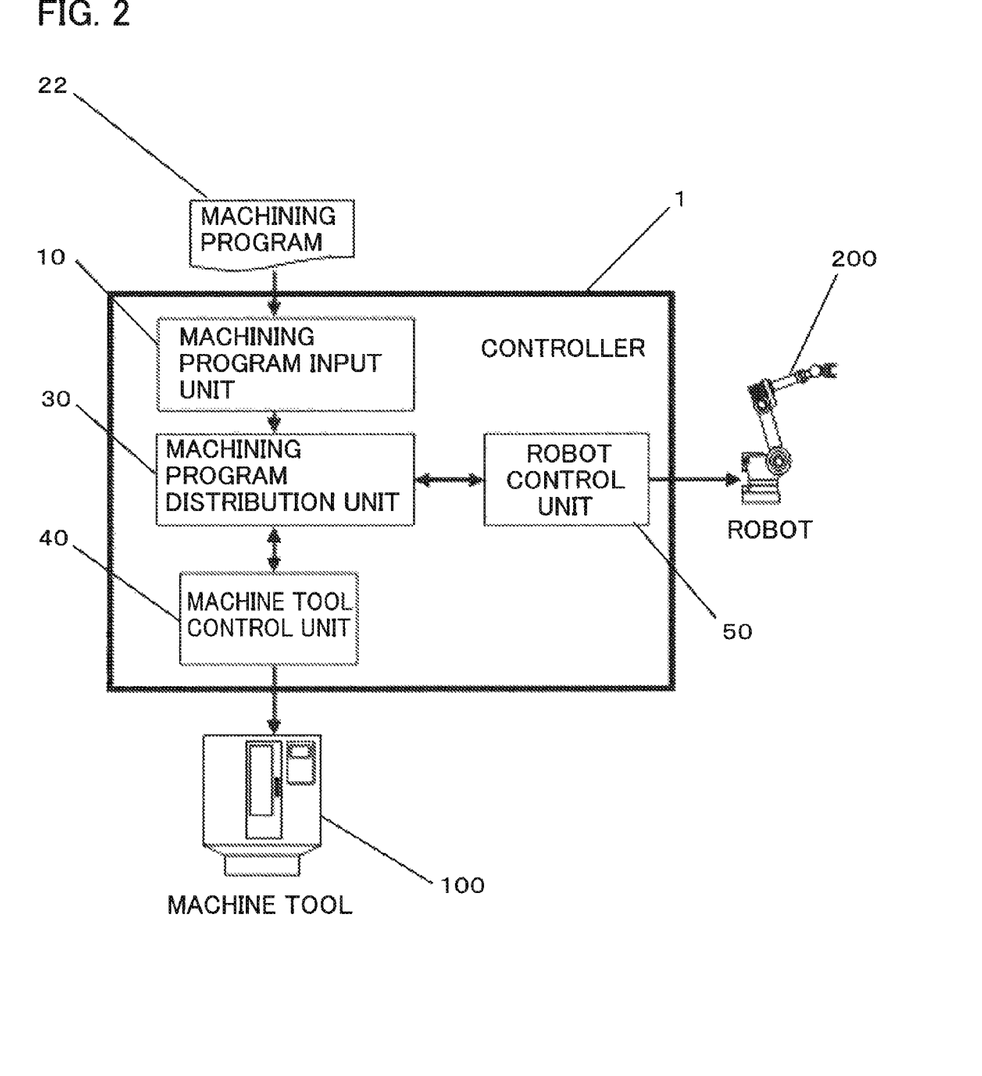
FIG. 2 is a diagram illustrating a configuration of a modification of the controller of FIG. 1 (first embodiment)

A controller 1 of FIG. 2 comprises a machining program input unit 10, machining program distribution unit 30, machine tool control unit 40, and robot control unit 50. It differs from the controller of FIG. 1 in that it does not comprise a machining program storage unit 20 therein. In the controller of FIG. 2, machining programs 22 externally input by the machining program input unit 10 are transferred directly to the machining program distribution unit 30. The machining program distribution unit 30 sequentially reads the content of the machining program 22 transferred from the machining program input unit 10. If the read content is a statement for machine tool, it is transferred to the machine tool control unit 40. If the read content is a statement for robot, on the other hand, it is transferred to the robot control unit 50. In the embodiment of FIG. 2, as in the first embodiment of FIG. 1, both a machine tool 100 and a robot 200 can be controlled based on the machining programs 22 including both the statements for machine tool and statements for robot.

Alternatively, a storage medium in which an externally created machining programs 22 may be connected to the controller 1 so that the machining programs can be read and input without being input by the machining program input unit 10, or the machining programs 22 may be read through a network.

A second embodiment of the controller according to the present invention will now be described with reference to FIG. 3.

Figure 3:
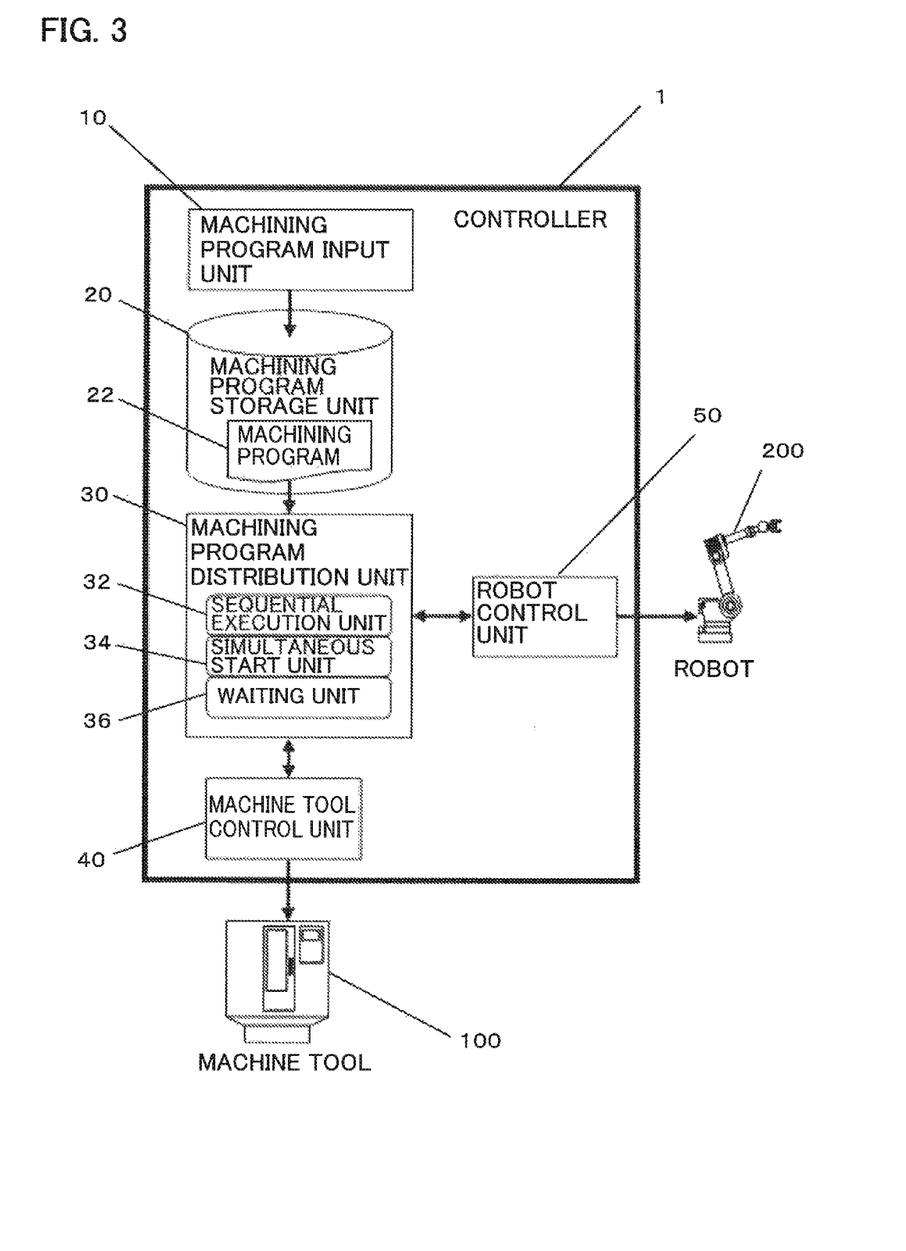
FIG. 3 is a diagram illustrating a configuration of a second embodiment of the controller according to the present invention.

A controller 1 shown in FIG. 3 is the same as the controller 1 of the first embodiment (FIG. 1) in that it comprises a machining program input unit 10, machining program storage unit 20, machining program distribution unit 30, machine tool control unit 40, and robot control unit 50. However, the controller 1 of FIG. 3 differs from that of FIG. 1 in that the machining program distribution unit 30 comprises a sequential execution unit 32, simultaneous start unit 34, and waiting unit 36.

A first example of a machining program executed by the controller of FIG. 3 will now be described with reference to FIGS. 4, 5 and 6.

Figure 4:
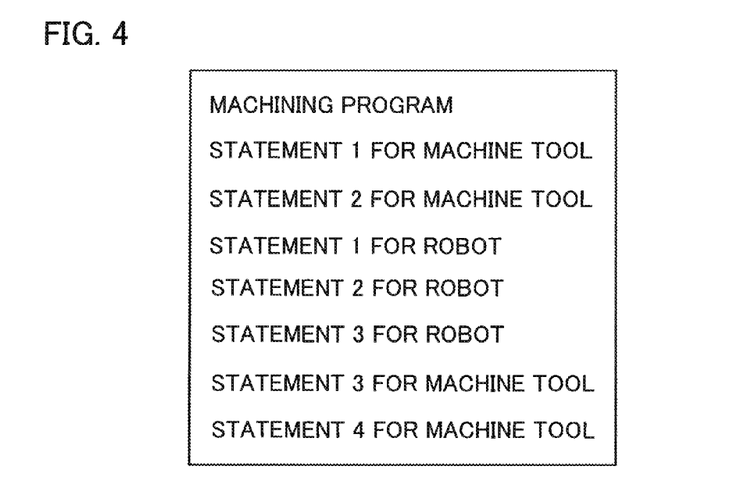
FIG. 4 is a diagram illustrating a first example of a machining program executed by the controller of FIG. 3.

FIG. 4 shows an example of the machining program 22 including both statements for machine tool and statements for robot. If the machining program 22 of this type is transferred, the machining program distribution unit 30 reads the lines of the machining program 22 one by one from top to bottom. If the read content is the statement for machine tool, it is transferred to the machine tool control unit 40 to instruct it the control of a machine tool 100. If the read content is the statement for robot, on the other hand, it is transferred to the robot control unit 50 to instruct it the control of a robot 200.

If the statement for robot is described in the line next to the statement for machine tool, it is transferred to the robot control unit to instruct it the control of the robot after the control by the machine tool control unit is finished. If the statement for machine tool is described in the line next to the statement for robot, in contrast, it is transferred to the machine tool control unit to instruct it the control of the machine tool after the control by the robot control unit is finished.

Figure 5:
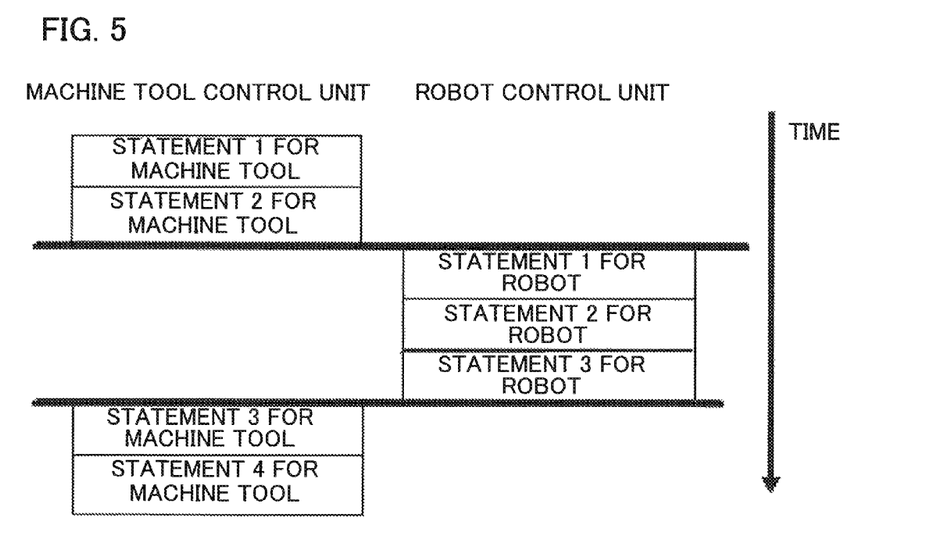
FIG. 5 is a diagram showing the operation timing of the machining program of FIG. 4.
Figure 6:
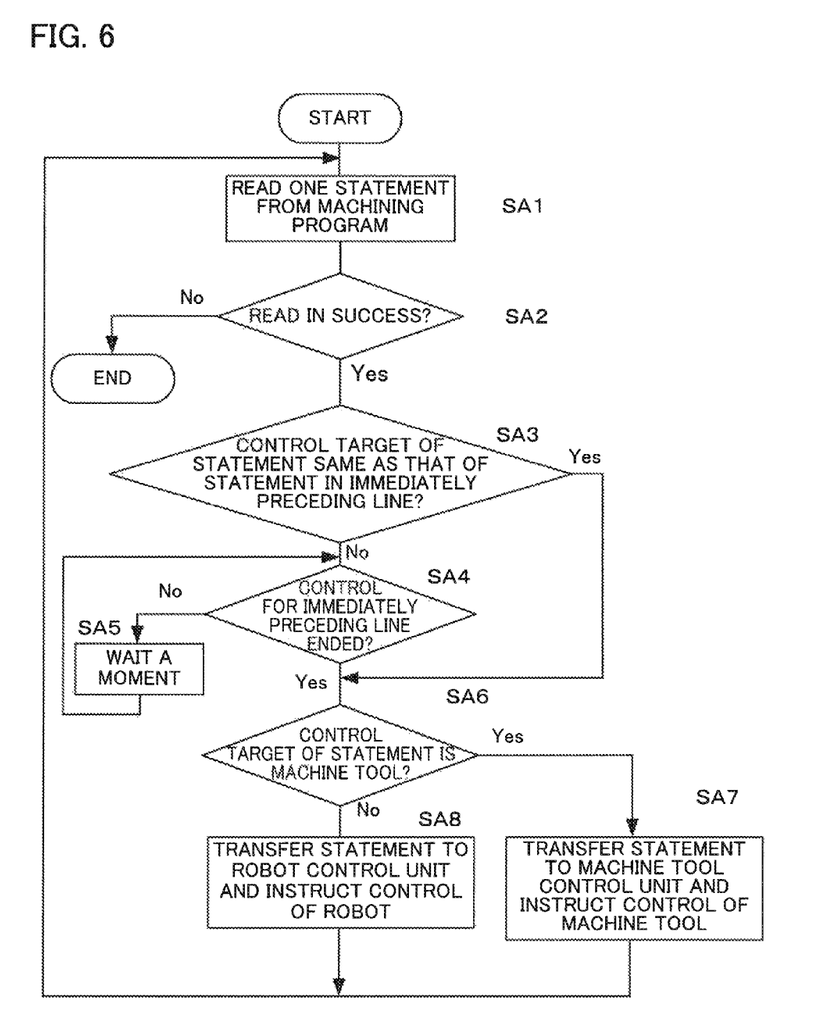
FIG. 6 is a flowchart showing a flow of processing for the controller of FIG. 3 to execute the machining program of FIG. 4.

Thus, if the target of the statement changes from the machine tool to the robot, as shown in the operation timing diagram of FIG. 5, the operation of the robot is started after the operation of the machine tool is finished. If the target of the statement changes from the robot to the machine tool, in contrast, the machine tool operation is started after the robot operation is finished.

A flow of processing for the controller of FIG. 3 to execute the machining program of FIG. 4 will now be described with reference to the flowchart of FIG. 6. The following is a sequential description of steps of this processing.

(Step SA1) One statement is read from the machining program.

(Step SA2) It is determined whether or not the statement is read in success. If the statement is read in success (YES), the processing proceeds to Step SA3. If not (NO), this processing ends.

(Step SA3) It is determined whether or not the target of the read statement is the same as that of the statement in the immediately preceding line. If the targets are the same (YES), the processing proceeds to Step SA6. If not (NO), the processing proceeds to Step SA4.

(Step SA4) It is determined whether or not the control of the immediately preceding line is finished. If this control is finished (YES), the processing proceeds to Step SA6. If not (NO), the processing proceeds to Step SA5.

(Step SA5) The end of the control of the immediately preceding line is awaited.

(Step SA6) It is determined whether or not the target of the control of the statement is the machine tool. If the target is the machine tool (YES), the processing proceeds to Step SA7. If the target is the robot (NO), the processing proceeds to Step SA8.

(Step SA7) The statement is transferred to the machine tool control unit to instruct it the control of the machine tool, whereupon the processing returns to Step SA1.

(Step SA8) The statement is transferred to the robot control unit to instruct it the control of the robot, whereupon the processing returns to Step SA1.

A second example of the machining program executed by the controller of FIG. 3 will now be described with reference to FIGS. 7 and 8.

Figure 7:
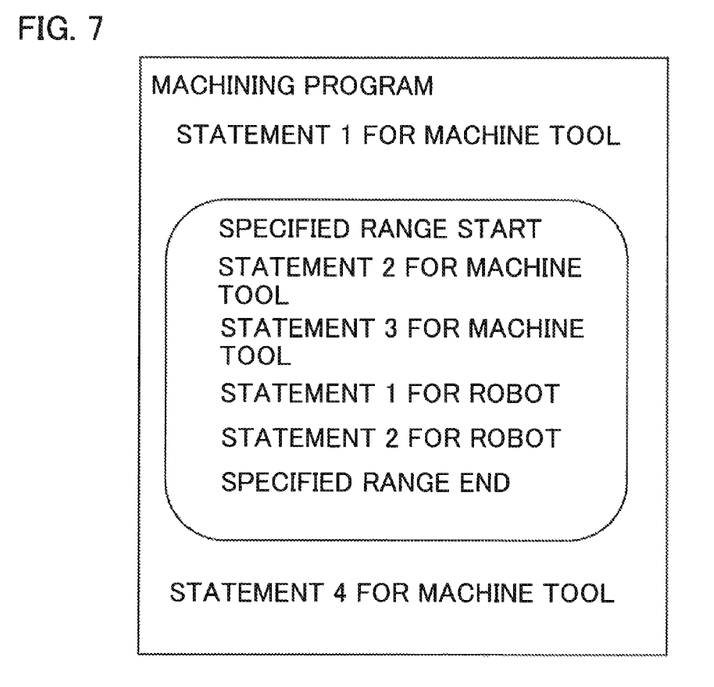
FIG. 7 is a diagram illustrating a second example of the machining program executed by the controller of FIG. 3.

FIG. 7 shows an example of the machining program 22 including a statement for simultaneous starting, as well as both statements for machine tool and statements for robot. In simultaneously actuating a machine tool and a robot according to this machining program, a statement for simultaneous actuation is specified by being sandwiched between two statements "SPECIFIED RANGE START" and "SPECIFIED RANGE END".

The machining program distribution unit is configured to read the lines of the machining program one by one from top to bottom. When the machining program distribution unit reads the statement "SPECIFIED RANGE START", it transfers the statement between the statements "SPECIFIED RANGE START" and "SPECIFIED RANGE END" to the machine tool control unit and the robot control unit. Thereafter, the machining program distribution unit simultaneously designates the start of control of the machine tool and that of the robot to the machine tool control unit and the robot control unit.

Figure 8:
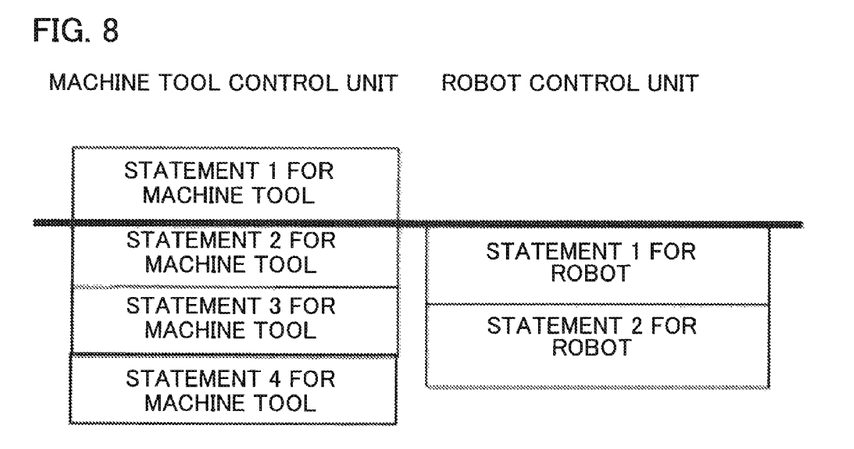
FIG. 8 is a diagram showing the operation timing of the machining program of FIG. 7.

Thus, as shown in the operation timing diagram of FIG. 8, "STATEMENT 2 FOR MACHINE TOOL" and "STATEMENT 3 FOR MACHINE TOOL" that are sandwiched between the statements "SPECIFIED RANGE START" and "SPECIFIED RANGE END" are transferred to the machine tool control unit, and "STATEMENT 1 FOR ROBOT" and "STATEMENT 2 FOR ROBOT" are transferred to the robot control unit. Then, operations based on the first statement ("STATEMENT 2 FOR MACHINE TOOL") transferred to the machine tool control unit and the first statement ("STATEMENT 1 FOR ROBOT") transferred to the robot control unit are simultaneously started. Thus, the operations of the machine tool and the robot are simultaneously started for the specified range.

An operation based on a statement ("STATEMENT 4 FOR MACHINE TOOL" in the example of FIG. 7) next to the statements ("STATEMENT 2 FOR MACHINE TOOL", "STATEMENT 3 FOR MACHINE TOOL", "STATEMENT 1 FOR ROBOT", and "STATEMENT 2 FOR ROBOT", in the example of FIG. 7) sandwiched between the statements "SPECIFIED RANGE START" and "SPECIFIED RANGE END" is started subsequent to the end of the operation based on "STATEMENT 3 FOR MACHINE TOOL".

A third example of the machining program executed by the controller of FIG. 3 will now be described with reference to FIGS. 9 and 10.

Figure 9:
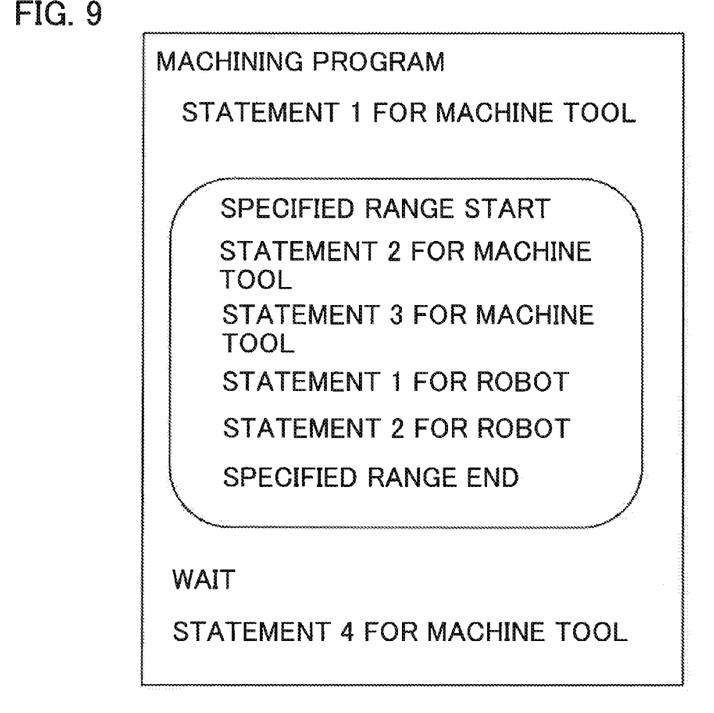
FIG. 9 is a diagram illustrating a third example of the machining program executed by the controller of FIG. 3.

FIG. 9 shows an example of the machining program 22 including statements for simultaneous starting and waiting, as well as both statements for machine tool and statements for robot. While this machining program is the same as the second example in that a statement for simultaneous actuation is sandwiched between two statements "SPECIFIED RANGE START" and "SPECIFIED RANGE END", it differs from the second example in that a statement "WAIT" directly follows the statement sandwiched between the statements "SPECIFIED RANGE START" and "SPECIFIED RANGE END".

In case where the statement "WAIT" directly follows the statement "SPECIFIED RANGE END", after the end of one of operations based on statements for machine tool and statements for robot that are sandwiched between the statements "SPECIFIED RANGE START" and "SPECIFIED RANGE END", whichever ends last, the subsequent statement is started.

Figure 10:
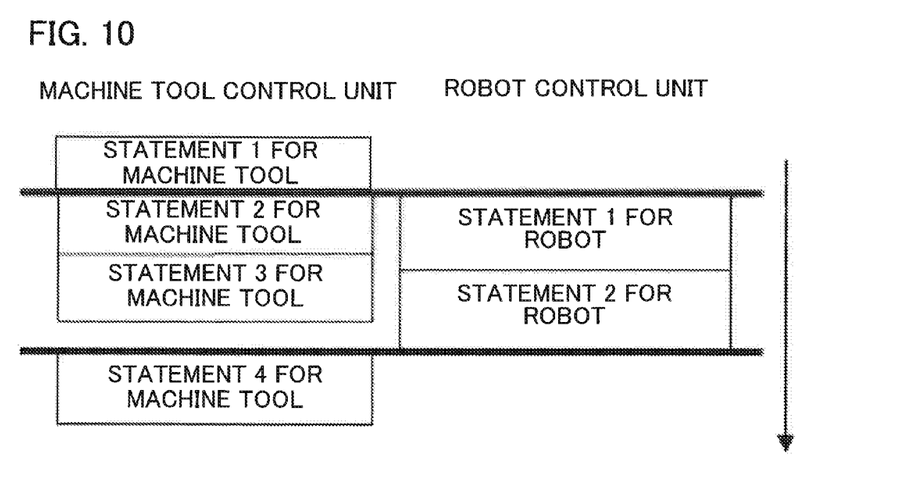
FIG. 10 is a diagram showing the operation timing of the machining program of FIG. 9.

FIG. 10 shows the operation timing of the machining program of FIG. 9. As shown in FIG. 10, an operation based on "STATEMENT 4 FOR MACHINE TOOL" is started after the end of an operation based on "STATEMENT 2 FOR ROBOT", which ends last among operations based on four statements "STATEMENT 2 FOR MACHINE TOOL", "STATEMENT 3 FOR MACHINE TOOL", "STATEMENT 1 FOR ROBOT", and "STATEMENT 2 FOR ROBOT" that are sandwiched between "SPECIFIED RANGE START" and "SPECIFIED RANGE END".

Figure 11A:
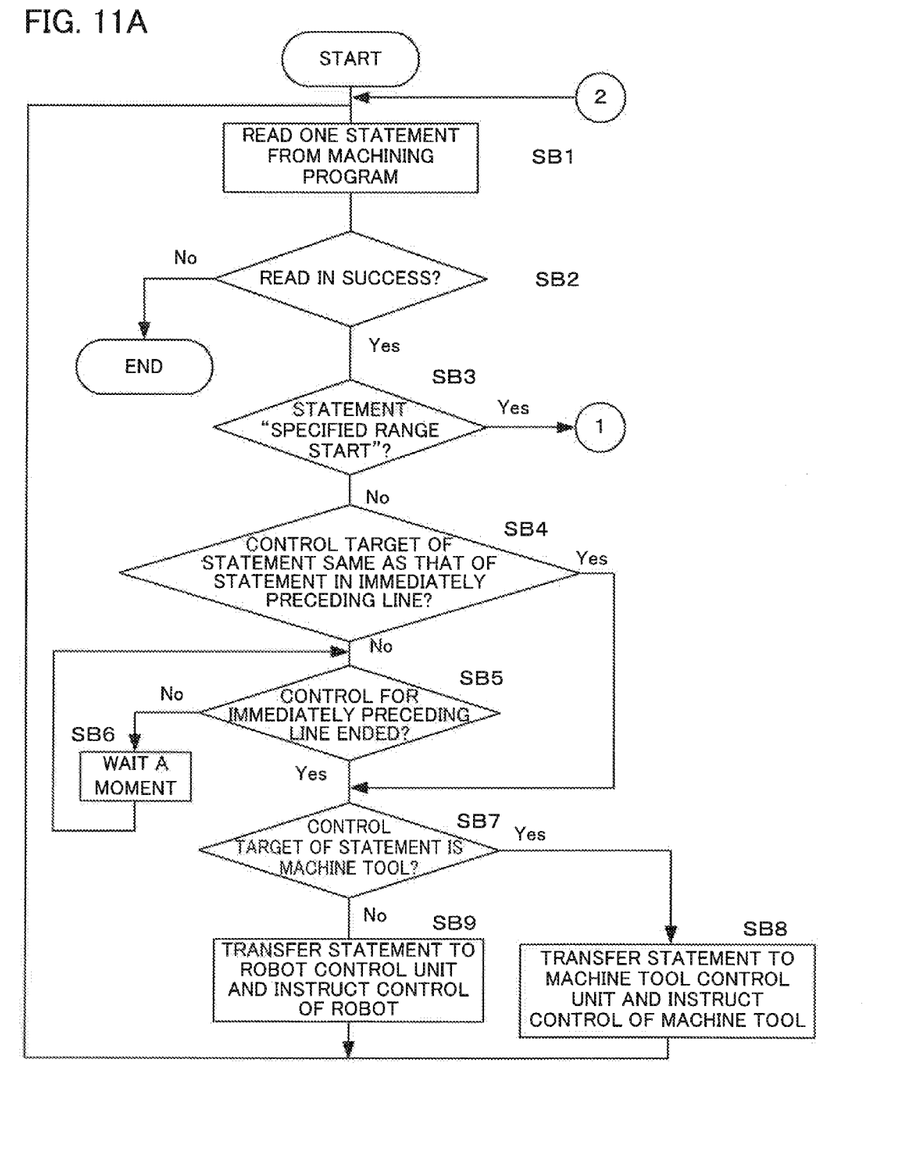
FIGS. 11A and 11B are flowcharts showing a flow of processing for the controller of FIG. 3 to execute the machining programs of FIGS. 7 and 9.
Figure 11B:
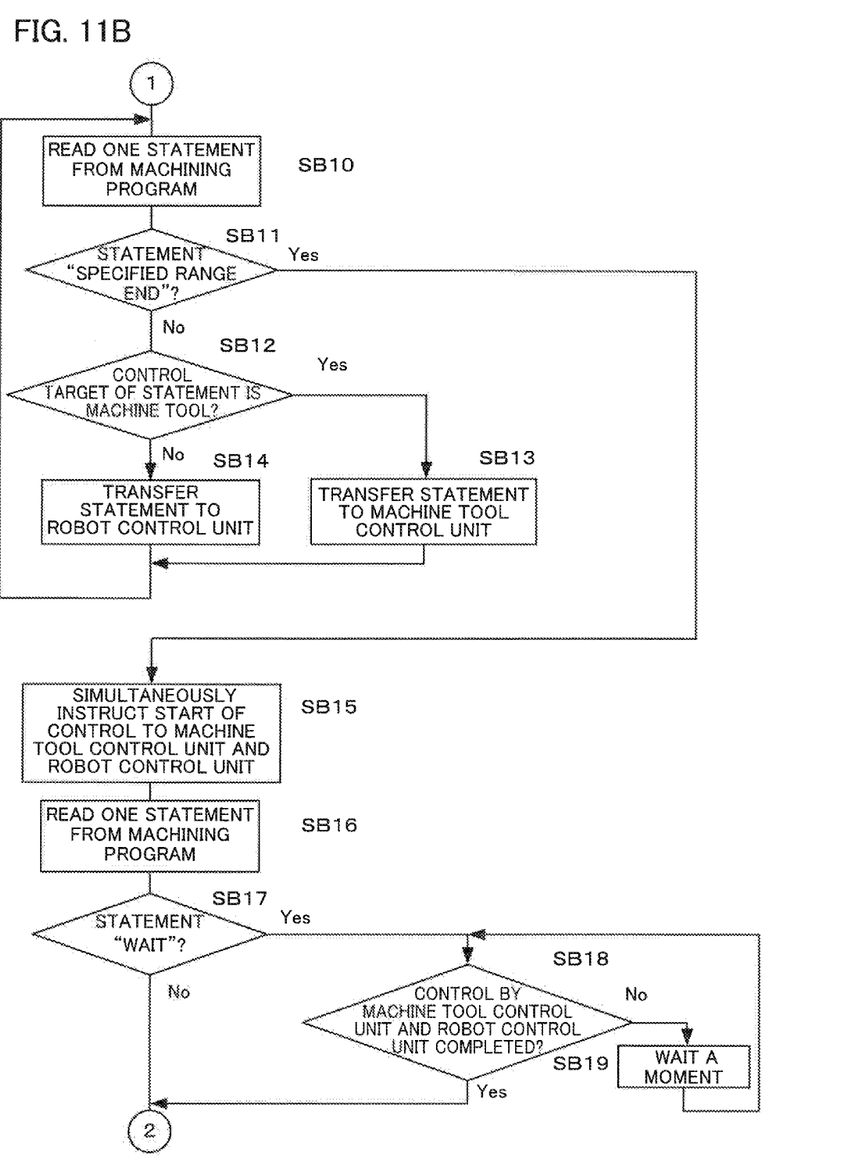

A flow of processing for the controller of FIG. 3 to execute the machining programs of FIGS. 7 and 9 will now be described with reference to the flowcharts of FIGS. 11A and 11B. The following is a sequential description of steps of this processing.

(Step SB1) One statement is read from the machining program.

(Step SB2) It is determined whether or not the statement is read in success. If the statement is read in success (YES), the processing proceeds to Step SB3. If not (NO), this processing ends.

(Step SB3) It is determined whether or not the read statement is "SPECIFIED RANGE START". If the read statement is "SPECIFIED RANGE START" (YES), the processing proceeds to Step SB10. If not (NO), the processing proceeds to Step SB4.

(Step SB4) It is determined whether or not the target of the control of the statement is the same as that of the statement in the immediately preceding line. If the targets are the same (YES), the processing proceeds to Step SB7. If not (NO), the processing proceeds to Step SB5.

(Step SB5) It is determined whether or not the control of the immediately preceding line is finished. If this control is finished (YES), the processing proceeds to Step SB7. If not (NO), the processing proceeds to Step SB6.

(Step SB6) The end of the control of the immediately preceding line is awaited.

(Step SB7) It is determined whether or not the target of the control of the statement is the machine tool. If the target is the machine tool (YES), the processing proceeds to Step SB8. If the target is the robot (NO), the processing proceeds to Step SB9.

(Step SB8) The statement is transferred to the machine tool control unit to instruct it the control of the machine tool, whereupon the processing returns to Step SB1.

(Step SB9) The statement is transferred to the robot control unit to instruct it the control of the robot, whereupon the processing returns to Step SB1.

(Step SB10) One statement is read from the machining program.

(Step SB11) It is determined whether or not the read statement is "SPECIFIED RANGE END". If the read statement is "SPECIFIED RANGE END" (YES), the processing proceeds to Step SB15. If not (NO), the processing proceeds to Step SB12.

(Step SB12) It is determined whether or not the target of the control of the statement is the machine tool. If the target is the machine tool (YES), the processing proceeds to Step SB13. If the target is the robot (NO), the processing proceeds to Step SB14.

(Step SB13) The statement is transferred to the machine tool control unit, whereupon the processing returns to Step SB10.

(Step SB14) The statement is transferred to the robot control unit, whereupon the processing returns to Step SB10.

(Step SB15) Start of control is simultaneously instructed to a machine tool control function and a robot control function, based on the statements transferred to the machine tool control unit and the robot control unit.

(Step SB16) One statement is read from the machining program.

(Step SB17) It is determined whether or not the statement is the statement "WAIT". If the statement is "WAIT" (YES), the processing proceeds to Step SB18. If not (NO), the processing returns to Step SB1.

(Step SB18) It is determined whether or not the control by the machine tool control unit and the robot control unit is completed. If the control is completed (YES), the processing returns to Step SB1. If not (NO), the processing proceeds to Step SB19.

(Step SB19) The completion of the control by the machine tool control unit and the robot control unit is awaited.

The controller of FIG. 3 used to execute the machining programs of FIGS. 7 and 9 has been described as comprising both the simultaneous start unit, which simultaneously designates the start of control to the machine tool control unit and the robot control unit, and the waiting unit, which performs control for the next statement after the completion of the control by the machine tool control unit and the robot control unit when the statement "WAIT" is given. Alternatively, however, the controller may be configured to comprise only the simultaneous start unit or the waiting unit.

The invention claimed is:

1. A controller for controlling at least one machine tool and at least one robot, the controller comprising:
   a machining program storage unit configured to store a machining program input to the controller, wherein the machining program includes at least one statement for machine tool and at least one statement for robot; and
   a processor configured as:
      a machine tool control unit configured to control the machine tool based on the statement for machine tool;
      a robot control unit configured to control the robot based on the statement for robot; and
      a machining program distribution unit configured to transfer, out of the statements for machine tool and for robot that are included in the machining program stored in the machining program storage unit,
         the statement for machine tool to the machine tool control unit, and
         the statement for robot to the robot control unit;
   wherein the machining program distribution unit comprises a simultaneous start unit configured to transfer the statements for machine tool and for robot, included within a range previously specified by the machining program, to the machine tool control unit and the robot control unit, respectively, and then simultaneously perform instructions of start of control based on the transferred statements to the machine tool control unit and the robot control unit, whereby the machine tool and the robot are simultaneously caused to start to be controlled by the simultaneous start unit.

2. The controller according to claim 1, wherein the machining program distribution unit comprises a waiting unit configured to wait until the completion of both the control by the machine tool control unit based on the statement transferred thereto and the control by the robot control unit based on the statement transferred thereto, whereby, after the end of the control of both the machine tool and the robot is awaited by the waiting unit, the next control is performed.

* * * * *